United States Patent
Kerr

(10) Patent No.: US 10,730,552 B2
(45) Date of Patent: Aug. 4, 2020

(54) TRACKED-VEHICLE REGENERATIVE STEERING DIFFERENTIAL

(71) Applicant: KER-TRAIN HOLDINGS LTD., Kingston (CA)

(72) Inventor: John Hugh Kerr, Kingston (CA)

(73) Assignee: Ker-Train Holdings Ltd., Kingston (CA)

( * ) Notice: Subject to any disclaimer, the term of this patent is extended or adjusted under 35 U.S.C. 154(b) by 253 days.

(21) Appl. No.: 15/776,634

(22) PCT Filed: Nov. 16, 2016

(86) PCT No.: PCT/CA2016/000284
§ 371 (c)(1),
(2) Date: May 16, 2018

(87) PCT Pub. No.: WO2017/083955
PCT Pub. Date: May 26, 2017

(65) Prior Publication Data
US 2018/0327027 A1    Nov. 15, 2018

Related U.S. Application Data

(60) Provisional application No. 62/256,111, filed on Nov. 16, 2015.

(51) Int. Cl.
*B62D 11/10*    (2006.01)

(52) U.S. Cl.
CPC ................................. *B62D 11/10* (2013.01)

(58) Field of Classification Search
None
See application file for complete search history.

(56) References Cited

U.S. PATENT DOCUMENTS 1,968,801 A * 7/1934 Moffett .................. F16H 48/08
                                                      475/221
4,614,132 A * 9/1986 Hall, III ................. B62D 11/10
                                                      475/22

(Continued)

FOREIGN PATENT DOCUMENTS

CA        2665023 A1    5/2008

*Primary Examiner* — Dirk Wright
(74) *Attorney, Agent, or Firm* — Capital Law Group

(57) ABSTRACT

A regenerative differential includes torque members, and a gear assembly that includes a primary gear set and a plurality of secondary gear sets. The primary gear set is configured to transfer torque between the secondary gear sets and first and second torque members. The first secondary gear set transfers torque between the primary gear set and a third torque member. The second secondary gear set transfers torque between the primary gear set and a fourth torque member. The gear assembly is configured to maintain a fixed relationship between torque member rotation velocities $\omega_1$, $\omega_2$, $\omega_3$, and $\omega_4$, such that $\omega_3 = M_L \omega_2 + \Delta_L \omega_1$, $\omega_4 = M_R \omega_2 + A_R \omega_1$, $M_L$ and $\Delta_L$ are functions of a ratio of the first secondary gear set, and $M_R$ and $\Delta_R$ are functions of $k_R$ of a ratio of the second secondary gear set.

14 Claims, 11 Drawing Sheets

(56) References Cited

U.S. PATENT DOCUMENTS

| | | | |
|---|---|---|---|
| 4,732,053 A | | 3/1988 | Gleasman et al. |
| 4,882,947 A | | 11/1989 | Barnard |
| 4,995,276 A | * | 2/1991 | Zaunberger ............ B62D 11/10 475/24 |
| 5,076,377 A | * | 12/1991 | Frazer .................... B62D 11/10 180/6.3 |
| 5,910,060 A | * | 6/1999 | Blume ................... B60K 17/04 475/221 |
| 6,033,337 A | | 3/2000 | Ohkuma et al. |
| 6,120,407 A | * | 9/2000 | Mimura ................. B60K 17/16 475/205 |
| 6,805,651 B2 | * | 10/2004 | Lipman .............. B60K 17/3462 475/205 |
| 7,004,876 B2 | * | 2/2006 | Puiu ................... B60K 17/3462 475/205 |
| 7,311,631 B2 | * | 12/2007 | Kushino ................ B60K 6/365 475/221 |
| 8,998,764 B2 | * | 4/2015 | Sten .......................... F16H 1/46 475/205 |

* cited by examiner

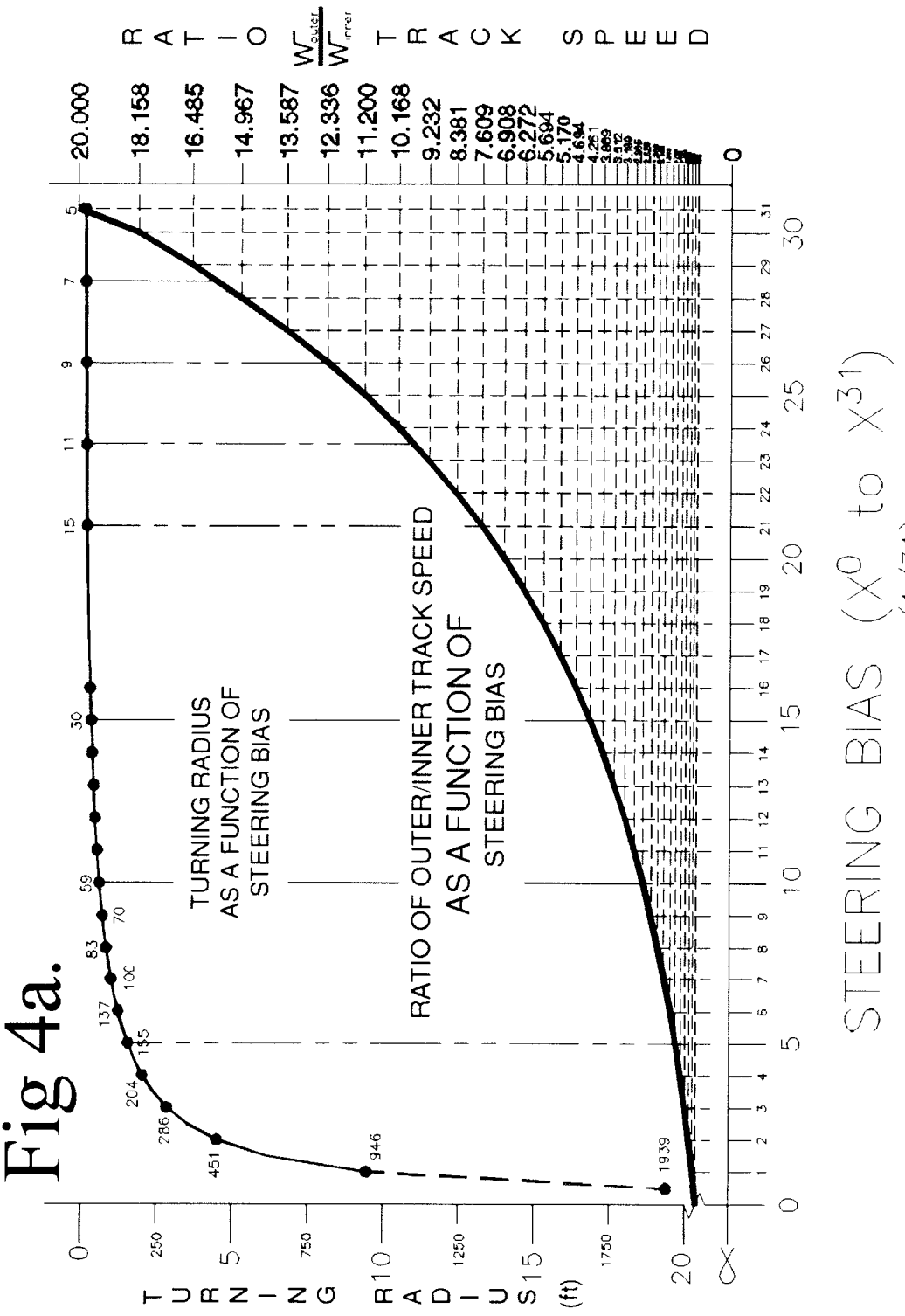

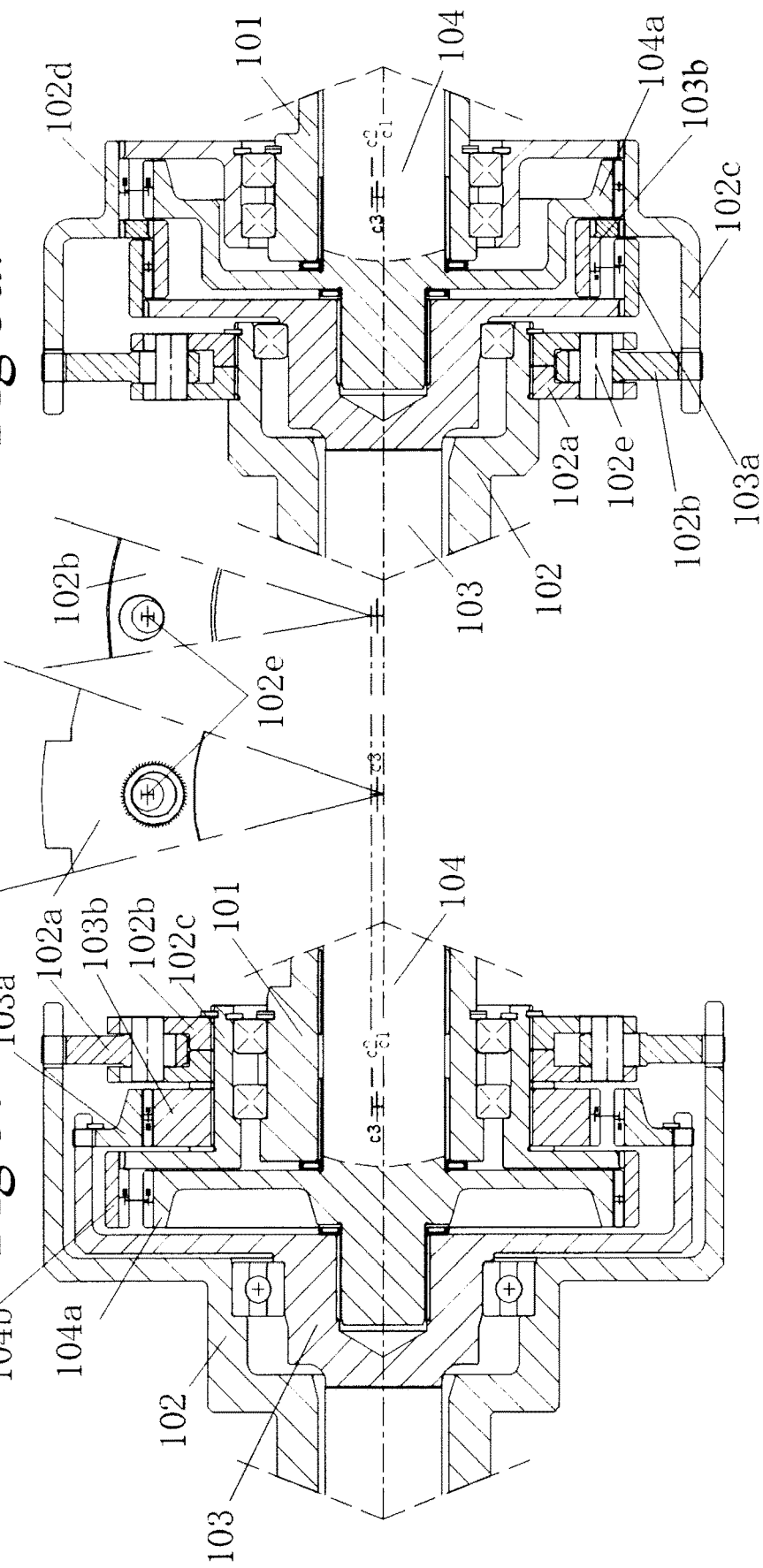

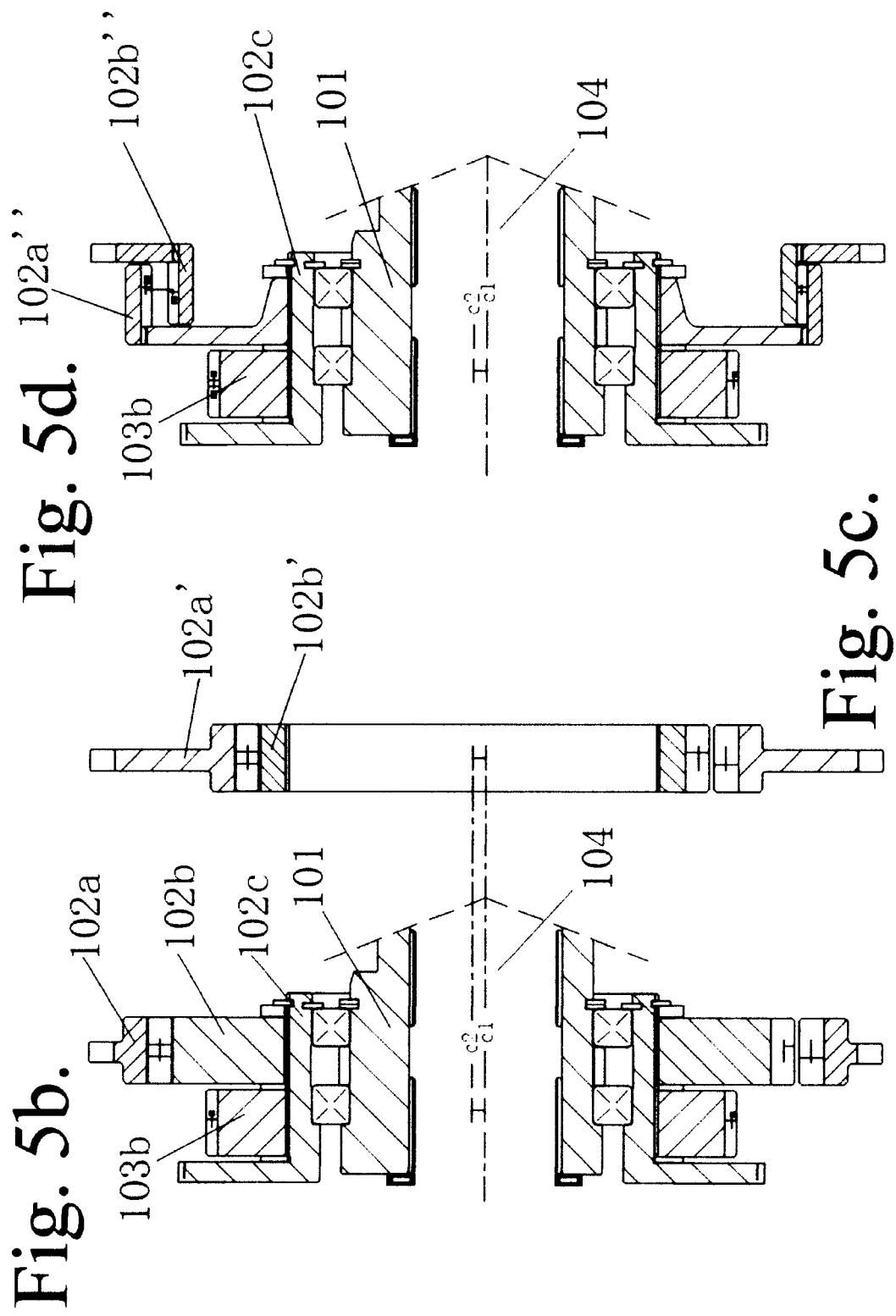

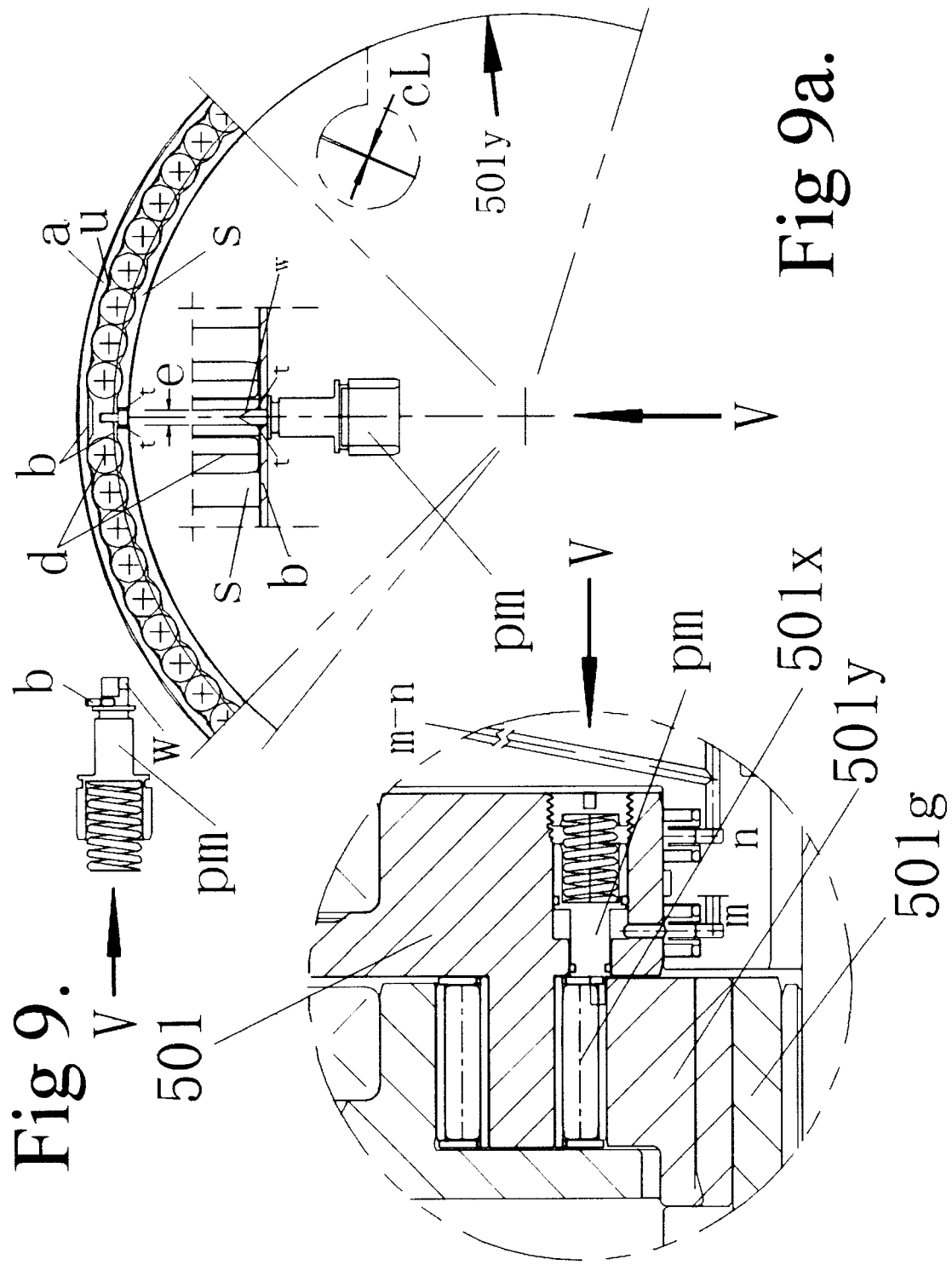

TRACKED-VEHICLE REGENERATIVE STEERING DIFFERENTIAL

RELATED APPLICATIONS

This patent application claims the benefit of the filing date of U.S. Patent Application No. 62/256,111, entitled "Tracked-Vehicle Regenerative Steering Differential Comprising Four Functional Members", filed Nov. 16, 2015, the contents of which are incorporated herein by reference.

FIELD

The present invention relates to steering mechanisms for tracked vehicles, more particularly to regenerative steering differentials that induce a turn in a tracked vehicle through differential output track speeds.

BACKGROUND

The transmission of a tracked vehicle is typically much different than the transmission of a wheeled vehicle. This is due to the fact that a wheeled vehicle has the ability to rotate a single or plurality of wheels with respect to the vehicle longitudinal direction, so as to induce a yaw component to the direction of travel, resulting in a turn. A tracked vehicle can operate with the same logic, provided there are a plurality of tracks that can be independently rotated with respect to the vehicle longitudinal axis. However, most tracked vehicles only have two parallel tracks that are at a fixed angle to the vehicle longitudinal axis. Therefore, steering must be induced by independently varying the speed of the tracks.

Conventional schemes for independently varying track speed include using separate drives for each track, a combination of clutches and brakes, and differentials with hydrostatic bias. These schemes, however, ultimately impose a negative drag torque to the inner track while the vehicle is turning, which induces high loadings on the transmission components and thereby requires the use of oversized transmission components.

SUMMARY OF THE INVENTION

By way of overview, this disclosure relates to a fully geared regenerative steering differential that allows for differential speed output to the left and right final drives of a tracked vehicle.

The differential includes a gear assembly and a plurality of torque members. The gear assembly includes a primary gear set and a plurality of secondary gear sets that are coupled to the primary gear set. The primary gear set is coupled to a first of the torque members and to a second of the torque members and is configured to transfer torque between the secondary gear sets and the first and second torque members via a torque transfer member that is common to the secondary gear sets.

A first of the secondary gear sets is coupled to a third of the torque members and is configured to transfer torque between the common torque transfer member and the third torque member. A second of the secondary gear sets is coupled to a fourth of the torque members and is configured to transfer torque between the common torque transfer member and the fourth torque member.

The gear assembly is configured to maintain a fixed kinematic relationship between a rotational velocity of the first torque member $\omega_1$, a rotational velocity of the second torque member $\omega_2$, a rotational velocity of the third torque member $\omega_3$, and a rotational velocity of the fourth torque member $\omega_4$, as follows:

$$\omega_3 = M_L\omega_2 + \Delta_L\omega_1,$$

$$\omega_4 = M_R\omega_2 + \Delta_R\omega_1,$$

where
$M_L$ and $\Delta_L$ are functions of $k_L$, and
$M_R$ and $\Delta_R$ are functions of $k_R$,
and where:
$k_L$ is a ratio of the first secondary gear set, and
$k_R$ is a ratio of the second secondary gear set.

In one example, the gear assembly is configured to simultaneously rotate the third torque member at a velocity $\omega_3'$ and the fourth torque member at a velocity $\omega_4'$, wherein the difference between the velocity $\omega_3'$ and the velocity $\omega_4'$ is proportional to the absolute difference between the velocity $\omega_1$ and the velocity $\omega_2$.

In another example, the gear assembly is configured to simultaneously rotate the third torque member at velocity $\omega_3'$ proportional to the velocity $\omega_1$, and to rotate the fourth torque member at velocity $-\omega_3'$, when $\omega_2=0$.

In another example, the gear assembly is configured to simultaneously rotate the third torque member and the fourth torque member at velocity $\omega_3'$ equal to the velocity $\omega_2$, when $\omega_1=\omega_2$.

In any of the foregoing examples, the differential may include a reversing section that is configured to selectively apply to the common torque transfer member a torque that has a based on a torque applied to a torque input of the reversing section and a torque applied to a torque input of the gear assembly.

When the differential is deployed in a tracked vehicle, an advantage realized by the differential is that the drag-torque from an inside track of the vehicle can translate directly to the outside track through the third and fourth torque members without necessarily propagating back into the first and second torque members.

BRIEF DESCRIPTION OF DRAWINGS

The differential will now be described, by way of example, with reference to the accompanying drawings, in which:

FIG. 4*a* is graph depicting turning radius as a function of steering bias for the steering differential;

FIG. 5 is a longitudinal cross-section of one variation of the steering differential, in which the primary gear set is configured as a one-to-one coupling, and the torque transfer member is configured as a spool that is disposed radially inwards of the secondary gear set;

FIG. 5a is a longitudinal cross-section of one variation of the steering differential, in which the torque transfer member is configured as a spool that is disposed radially outwards of the secondary gear set;

FIG. 5b is a longitudinal cross-section of one variation of the steering differential, in which the primary gear set is configured as a coplanar pinion and annulus gear set;

FIG. 5c is a cross-section of one variation of the coplanar pinion and annulus gear set shown in FIG. 5b;

FIG. 5d is a longitudinal cross-section of one variation of the steering differential, in which the functions of the pinion and annulus of the coplanar gear set are radially reversed relative to those of FIG. 5b;

FIGS. 9 and 9a are magnified views of the clutch actuator of the reversing section depicted in FIG. 8.

Figure 1:
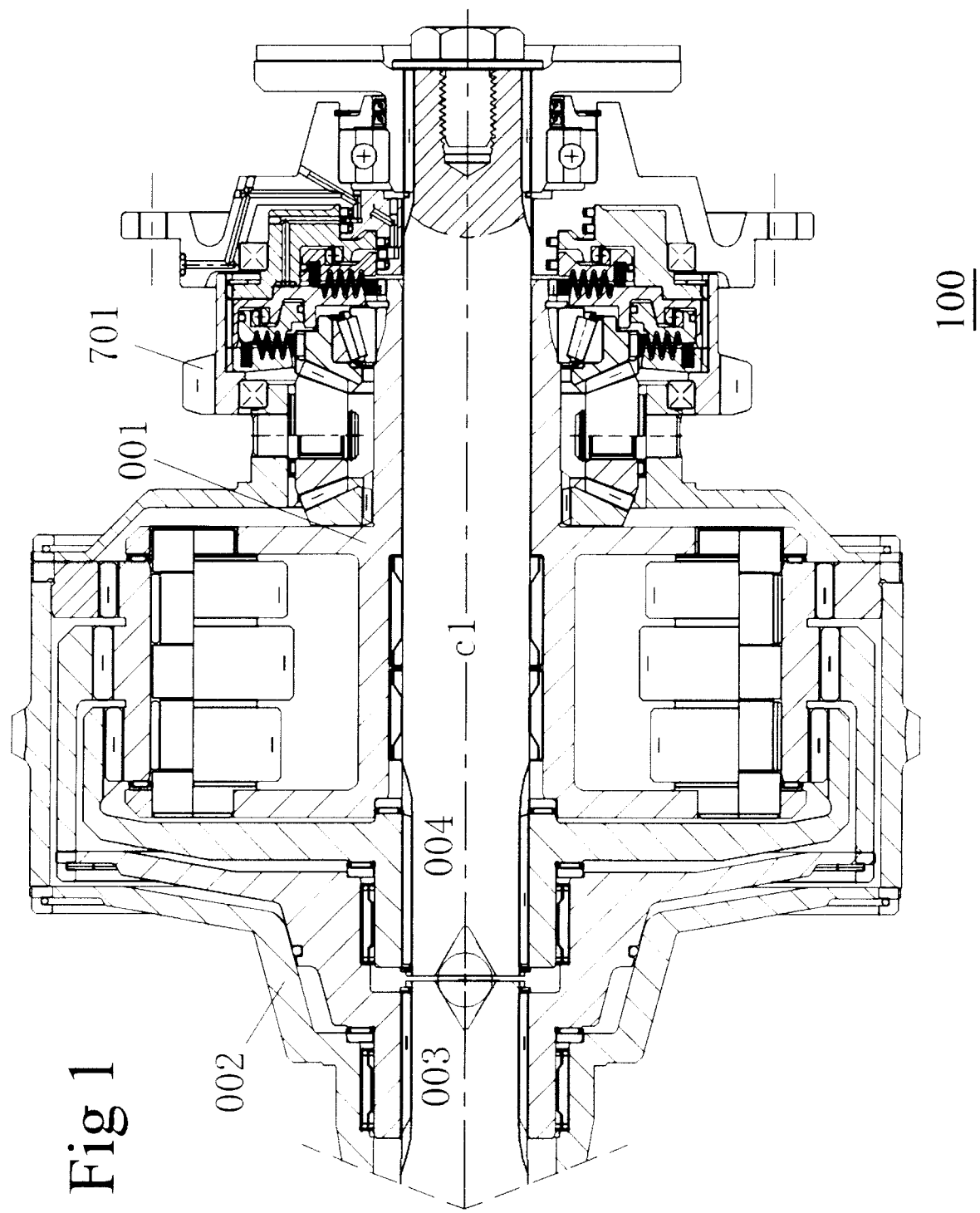
FIG. 1 is a longitudinal cross-section of a regenerative steering differential that includes a gear assembly and an optional reversing section.

While the casing structures, pressure seals, hydraulic feeds, and related kinematic members are depicted in the drawings, only the kinematic members of the differential are depicted with hatching.

DETAILS

FIG. 1 depicts a regenerative steering differential, denoted generally as 100, that includes a plurality of torque members 001, 002, 003, 004, and a gear assembly that is coupled to the torque members 001, 002, 003, 004. As shown, the first torque member 001, the second torque member 002, the third torque member 003, and the fourth torque member 004 may each be configured as a substantially cylindrical elongate drive shaft.

As shown, the torque members 001, 002, 003, 004 may all have a common axis of rotation $c_1$. However, the regenerative steering differential is not limited to this configuration. Rather, as will become apparent, one or more of the torque members 001, 002, 003, 004 may have an axis of rotation that is parallel to and offset from an axis of rotation of another of the torque members 001, 002, 003, 004.

The first torque member 001 may be coupled to a biasing transmission of a tracked vehicle, the second torque member 002 may be coupled to the tracked vehicle's main drive transmission, the third torque member 003 may be coupled to the tracked vehicle's left drive track, and the fourth torque member 004 may be coupled to the tracked vehicle's right drive track. However, the regenerative steering differential 100 is again not limited to the foregoing deployment, but instead may find applications where a pair of torque outputs are generated from a pair of independent torque inputs.

Further, although the first and second torque members 001, 002 may be thought of as torque inputs, and the third and fourth torque members 003, 004 may be thought of as torque outputs, it should be understood that the third and fourth torque members 003, 004 may provide torque inputs to, and the first and second torque members 001, 002 may comprise torque outputs from, the regenerative steering differential 100.

Several implementations of the gear assembly will be discussed in detail below. At this introductory point of the discussion, however, it is sufficient to note that the gear assembly includes a primary gear set and a plurality of secondary gear sets that are coupled to the primary gear set. The primary gear set is coupled to the first torque member 001 and to the second torque member 002, and is configured to transfer torque between the secondary gear sets and the first and second torque members 001, 002 via a torque transfer member that is common to the secondary gear sets.

Further, a first of the secondary gear sets is coupled to the third torque member 003, and is configured to transfer torque between the common torque transfer member and the third torque member 003. Similarly, a second of the secondary gear sets is coupled to the fourth torque member 004, and is configured to transfer torque between the common torque transfer member and the fourth torque member 004.

As will be explained, the gear assembly is configured to maintain a fixed kinematic relationship between the rotational velocity of the torque members 001, 002, 003, 004, such that the rotational velocity $\omega_3$ of the third torque member 003 is a linear weighted function of (i) the rotational velocity $\omega_1$ of the first torque member 001, (ii) the rotational velocity $\omega_2$ of the second torque member 002, and (iii) the ratio $k_L$ of the first secondary gear set. Similarly, the rotational velocity $\omega_4$ of the fourth torque member 004 is a linear weighted function of (i) the rotational velocity $\omega_1$ of the first torque member 001, (ii) the rotational velocity $\omega_2$ of the second torque member 002, and (iii) the ratio $k_R$ of the second secondary gear set.

In other words, the gear assembly is configured such that:

$$\omega_3 = M_L\omega_2 + \Delta_L\omega_1, \quad [1]$$

$$\omega_4 = M_R\omega_2 + \Delta_R\omega_1, \text{ and} \quad [2]$$

where:

$M_L$ and $\Delta_L$ are respective functions of $k_L$, and
$M_R$ and $\Delta_R$ are respective functions of $k_R$.

In addition to the gear assembly, the regenerative steering differential 100 may optionally also include a reversing section that is configured to selectively apply to the common torque transfer member a torque that has a based on a torque applied to a torque input of the reversing section and a torque applied to a torque input of the gear assembly.

Figure 2:
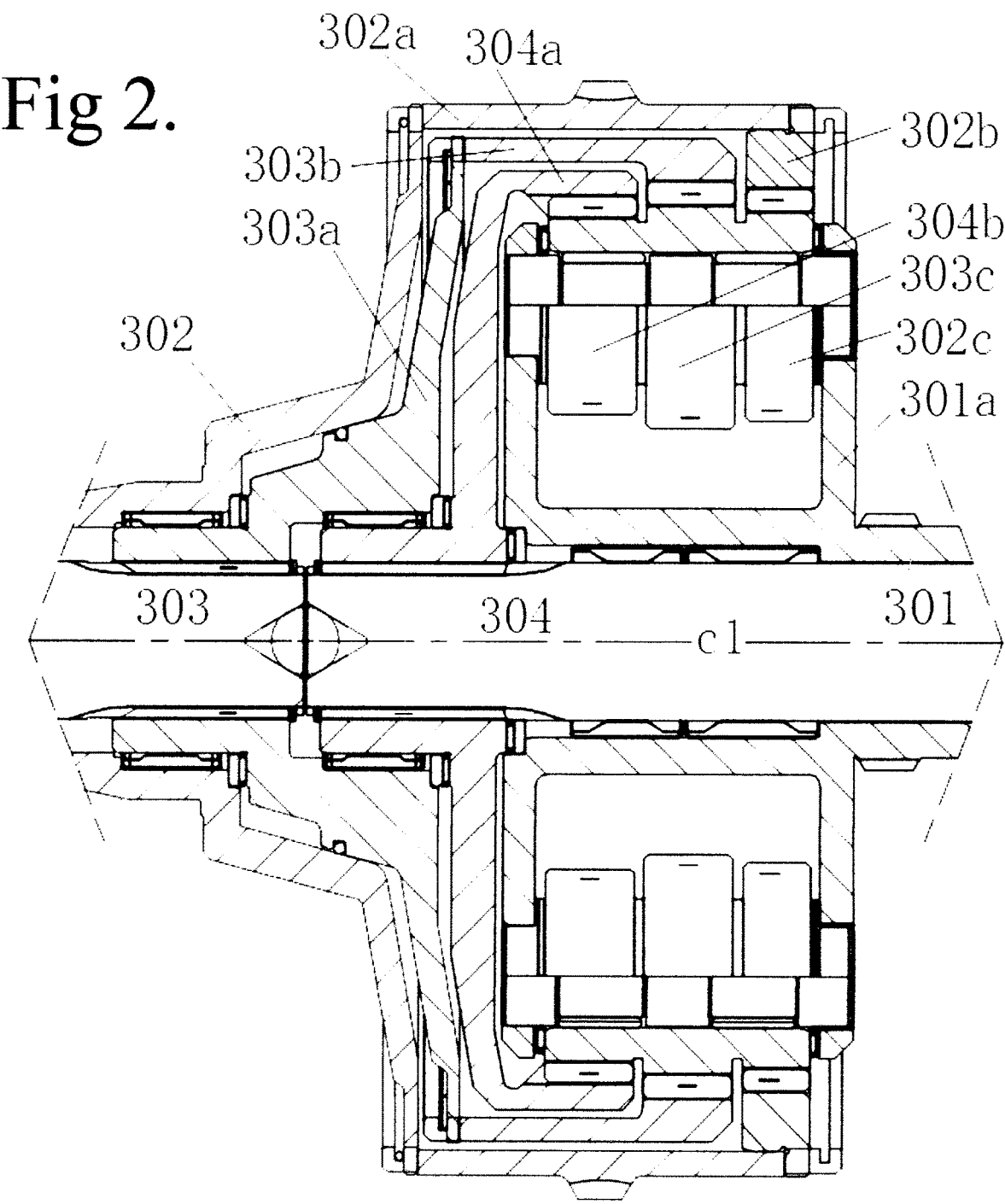
FIG. 2 is a longitudinal cross-section of the gear assembly of the steering differential depicted in FIG. 1, in which the gear assembly includes a primary gear set, a secondary gear set, and torque transfer member between the primary and secondary gear sets.

FIG. 2 depicts, in greater detail, the gear assembly of the regenerative steering differential 100 shown in FIG. 1. As discussed, the gear assembly includes a primary gear set and a plurality of secondary gear sets.

As shown, the primary gear set includes a primary annular gear 302b, and a primary pinion 302c that is disposed radially inwards of the primary annular gear 302b. The primary annular gear 302b is coupled to the second torque member 302 by a conical member that extends radially outwards from the third torque member 303 (corresponding to the third torque member 003), and a cylindrical body member 302a that extends between and is secured to the conical member and the primary annular gear 302b. The primary pinion 302c is coplanar with, and in pitch circle congruency with, the primary annular gear 302b (i.e. primary pinion 302c has radially outward-extending gear teeth that mesh with radially inward-extending gear teeth of the primary annular gear 302b).

The first secondary gear set includes a first annular gear 303b, and a first pinion 303c that is disposed radially inwards of the first annular gear 303b. The first annular gear 303b is coupled to the third torque member 303 by a first disc member 303a that is fixed to and extends radially outwards from the third torque member 303, and a cylindrical body member 303b that extends between and is secured to the first disc member 303a and the first annular gear 303b. The first pinion 303c is coplanar with, and in pitch circle congruency with, the first annular gear 303b (i.e. first pinion 303c has radially outward-extending gear teeth that mesh with radially inward-extending gear teeth of the first annular gear 303b).

The second secondary gear set includes a second annular gear 304a, and a second pinion 304b that is disposed radially inwards of the second annular gear 304a. The second annular gear 304a is secured to and extends radially outwards from the fourth torque member 304 (corresponding to the fourth torque member 004). As above, the second pinion 304b is coplanar with, and in pitch circle congruency with, the second annular gear 304a (i.e. second pinion 304b has radially outward-extending gear teeth that mesh with radially inward-extending gear teeth of the second annular gear 304a).

The gear assembly also includes a torque transfer member 301a that is integral with the first torque member 301 (corresponding to first torque member 001). The torque transfer member 301a may be configured as a spool that extends radially outwards from the first torque member 301. The primary pinion 302c, the first pinion 303c and the second pinion 304b are all mounted on and rotatably coupled to the torque transfer member 301a. Accordingly, the torque transfer member 301a is common to the primary gear set, the first secondary gear set, and the second secondary gear set.

The primary pinion 302c, the first pinion 303c and the second pinion 304b rotate in unison relative to the torque transfer member 301a. Therefore, as shown, the primary pinion 302c, the first pinion 303c and the second pinion 304b may comprise a monolithic pinion gear. Alternately, the primary pinion 302c, the first pinion 303c and the second pinion 304b may be fabricated as distinct pinions that are fastened together at their respective abutting faces, such that the primary pinion 302c, the first pinion 303c and the second pinion 304b rotate in unison relative to the torque transfer member 301a.

The gear assembly is configured to maintain a fixed kinematic relationship between the torque members 001, 002, 003, 004, such that the rotational velocity $\omega_3$ of the third torque member 003 is a linear weighted function of (i) the rotational velocity $\omega_1$ of the first torque member 001, (ii) the rotational velocity $\omega_2$ of the second torque member 002, and (iii) the ratio $k_L$ of the first secondary gear set. Similarly, the rotational velocity $\omega_4$ of the fourth torque member 004 is a linear weighted function of (i) the rotational velocity $\omega_1$ of the first torque member 001, (ii) the rotational velocity $\omega_2$ of the second torque member 002, and (iii) the ratio $k_R$ of the second secondary gear set.

In other words, the gear assembly is configured such that:

$$\omega_3 = M_L \omega_2 + \Delta_L \omega_1, \quad [1]$$

$$\omega_4 = M_R \omega_2 + \Delta_R \omega_1, \text{ and} \quad [2]$$

where:
$M_L$ and $\Delta_L$ are respective functions of $k_L$, and
$M_R$ and $\Delta_R$ are respective functions of $k_R$.
$M_L$ and $\Delta_L$ may be functions of the product of the ratio $k_M$ of the primary gear set and the ratio $k_L$ of the first secondary gear set. Similarly, $M_R$ and $\Delta_R$ may be functions of the product of the ratio $k_M$ of the primary gear set and the ratio $k_R$ of the second secondary gear set.

In the foregoing embodiment:

$$M_L = k_M k_L,$$

$$\Delta_L = 1 - M_L,$$

$$M_R = k_M k_R,$$

$$\Delta_R = 1 - M_R,$$

where:
$k_M$ is a ratio of the primary gear set measured relative to the common torque transfer member,
$k_L$ is measured relative to the third torque member 003, and
$k_R$ is measured relative to the fourth torque member 004.

More specifically:

the ratio $k_M$ of the primary gear set = $a_M/p_M$, the ratio $k_L$ of the first secondary gear set = $p_L/a_L$, and the ratio $k_R$ of the second secondary gear set = $p_R/a_R$, where:
$a_M$ = the number of teeth on the primary annular gear 302b,
$p_M$ = the number of teeth on the primary pinion 302c,
$a_L$ = the number of teeth on the first annular gear 303b,
$p_L$ = the number of teeth on the first pinion 303c,
$a_R$ = the number of teeth on the second annular gear 304a, and
$p_R$ = the number of teeth on the second pinion 304b.

If the ratios $k_M$, $k_R$ and $k_L$ are constrained by the requirements of the following equation:

$$k_M k_L + k_M k_R = 2 \quad [3]$$

and torque is applied to the first torque member 001 and to the second torque member 002, such that the first torque member 001 rotates at a velocity $\omega_1$ and the second torque member 002 rotates at a velocity $\omega_2$, the gear assembly simultaneously rotates the third torque member 003 at a velocity $\omega_3'$ and rotates the fourth torque member 004 at a velocity $\omega_4'$, such that the difference between the velocity $\omega_3'$ and the velocity $\omega_4'$ is proportional to the absolute difference between the velocity $\omega_1$ and the velocity $\omega_2$.

More specifically, where the ratios $k_M$, $k_R$ and $k_L$ are constrained by the requirements of Equation [3]:

$$\omega_3' = \omega_2 + (\omega_1 - \omega_2)\delta, \text{ and} \quad [4]$$

$$\omega_4' = \omega_2 - (\omega_1 - \omega_2)\delta, \quad [5]$$

where:

$$\delta = 1 - k_M k_L = k_M k_R - 1.$$

Therefore, if the regenerative steering differential 100 is deployed in a tracked vehicle, such that the first and second torque members 001, 002 are respectively coupled to the biasing and main drive transmissions of the vehicle, the third and fourth torque members 003, 004 are respectively coupled to the tracked vehicle's left and right drive tracks, and the vehicle is travelling in the forward (or reverse) direction, positive and negative differentials of the same magnitude between the output speeds of the biasing and main transmissions will produce right and left turns with the same turning radii, respectively.

If the ratios $k_M$, $k_R$ and $k_L$ are constrained by the requirements of Equation [3], and torque is applied to the first and second torque members 001, 002 such that the first and second torque member 001 both rotate at a velocity $\omega_2$, the gear assembly simultaneously rotates the third and fourth torque members 003, 004 at a velocity $\omega_3=\omega_2$.

Expressed mathematically, where the ratios $k_M$, $k_R$ and $k_L$ are constrained by the requirements of Equation [3], and $\omega_2=\omega_1$:

$$\omega_4=\omega_3=\omega_2, \quad [6]$$

where:

$$\delta=1-k_M k_L=k_M k_R-1.$$

Therefore, if the regenerative steering differential 100 is deployed in a tracked vehicle, and the first and second torque members 001, 002 are rotating at the same speed, the tracked vehicle will move in a straight line. In this case, there are no meshing losses within the regenerative steering differential 100 since as the gear assembly acts as a solid coupling and all power is transmitted to the left and right track members through the main transmission only.

If the ratios $k_M$, $k_R$ and $k_L$ are constrained by the requirements of Equation [3], and torque is applied only to the first torque member 001 such that the first torque member 001 rotates at a velocity $\omega_1$, but the second torque member 002 is prevented from rotating, the gear assembly simultaneously rotates the third torque member 003 at a velocity $\omega_3''$ that is proportional to the velocity $\omega_1$, and rotates the fourth torque member at velocity $-\omega_3''$.

More specifically, where the ratios $k_M$, $k_R$ and $k_L$ are constrained by the requirements of Equation [3], and $\omega_2=0$:

$$\omega_3''=\omega_1 \delta, \text{ and}$$

$$\delta=1-k_M k_L=k_M k_R-1. \quad [7]$$

Therefore, if the regenerative steering differential 100 is deployed in a tracked vehicle and braking is applied to the second torque member 002, for each revolution of the first torque member 001 the gear assembly simultaneously rotates the third and fourth torque members 003, 004 plus/minus or minus/plus $\delta=1-k_M k_L=k_M k_R-1$ revolutions. As a result, the tracked vehicle executes a pivot turn to the right or left, respectively. Since the angular velocities of the left and right tracks members is a function of $\delta$ (and the biasing transmission output speed), $\delta$ is referred to as a "steering sensitivity factor".

Conversely, if the relationship of Equation [3] is violated, the steering sensitivity factor will be different for left and right turns.

More specifically:

$$\omega_3'=\omega_2+(\omega_1-\omega_2)\delta_L, \text{ and} \quad [8]$$

$$\omega_4'=\omega_2-(\omega_1-\omega_2)\delta_R, \quad [9]$$

where:

$$\delta_L=1-k_M k_L; \text{ and}$$

$$\delta_R=k_M k_R-1.$$

Therefore, if the regenerative steering differential 100 is deployed in a tracked vehicle, given a constant main transmission output speed, positive and negative differentials of the same magnitude between the biasing and main transmission output speeds will not produce left and right turns with the same turning radii. However, straight travel is still produced when the output speeds of the biasing and main transmissions are equal.

Figure 3:
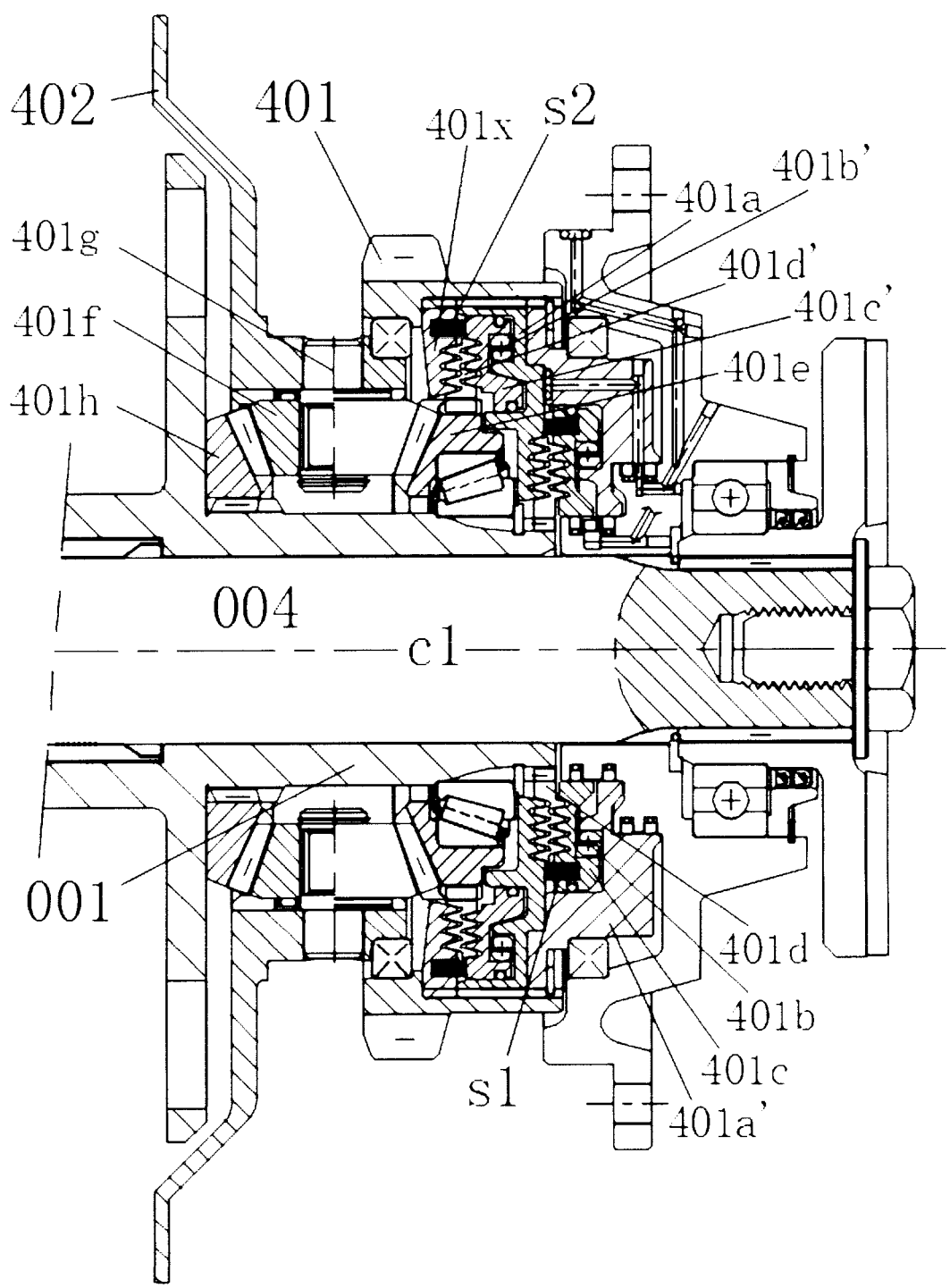
FIG. 3 is a longitudinal cross-section of the optional reversing section of the steering differential depicted in FIG. 1.

FIG. 3 depicts, in greater detail, the optional reversing section of the regenerative steering differential 100 shown in FIG. 1. As discussed, the reversing section selectively applies to the common torque transfer member 301a a torque that has a based on a torque applied to a torque input of the reversing section and a torque applied to a torque input of the gear assembly.

The reversing section is coupled to the gear assembly through the first torque member 001, and through a conical member 402 that extends radially inwards from and is secured to the cylindrical body member 302a of the gear assembly.

The reversing section includes an input gear 401, a symmetrical three-element bevel gear set, and a clutch assembly that is coupled to the input gear 401 and the bevel gear set. The bevel gear set includes a first bevel gear 401h, a second bevel gear 401e, and a third bevel gear 401f. The first bevel gear 401h is fixed to the first torque member 001. The second bevel gear 401e is rotatably coupled to the first torque member 001 via a thrust bearing that is carried on the first torque member 001.

The third bevel gear 401f is disposed between the first bevel gear 401h and the second bevel gear 401e, and is rotatably coupled to the conical member 402 via a spindle element 401g that is carried on the conical member 402. The gear teeth of the third bevel gear 401f mesh with the gear teeth of the first bevel gear 401h and the second bevel gear 401e. Therefore, the third bevel gear 401f is configured to transfer torque between the first bevel gear 401h and the second bevel gear 401e.

The clutch assembly of the reversing section may be configured as a pair of V-groove clutches, as described for example in U.S. Pat. No. 6,126,566 entitled "Coplanar Reverted Gear Train Loop". Therefore, as shown in FIG. 3, the clutch assembly may include a cylindrical body member 401a' that extends from and is splined to the input gear 401 (a torque input to the reversing section), and an inner V-groove clutch and an outer V-groove clutch that are coupled to the input gear 401.

As shown, the outer V-groove clutch may include an outer disc-shaped side plate 401a that is splined to the input gear 401, a hydraulically-actuated outer disc-shaped piston side plate 401c, and an outer disc-shaped interactive member 401d that is splined to the first torque member 001 and is disposed between the outer side plate 401a and the outer piston side plate 401c.

The outer piston side plate 401c is coupled to the cylindrical element 401a' via ball splines 401b that allow the outer piston side plate 401c to move axially towards the outer interactive member 401d when hydraulic pressure is applied to the outer piston side plate 401c, and also allow the outer piston side plate 401c to move axially away from the outer interactive member 401d when the outer piston side plate 401c is inactive. The first V-groove clutch may also include a return spring s1 that is disposed between the outer side plate 401a and the outer piston side plate 401c to urge the outer piston side plate 401c away from the outer interactive member 401d when the outer piston side plate 401c is inactive.

Similarly, the inner V-groove clutch may include an inner disc-shaped side plate 401x that is fixed to the input gear 401, a hydraulically-actuated inner disc-shaped piston side plate 401c', and an inner disc-shaped interactive member 401d' that is splined to the second bevel gear 401e and is disposed between the inner side plate 401x and the inner piston side plate 401c'. The inner piston side plate 401c' is coupled to the outer side plate 401a via ball splines 401b' that allow the inner piston side plate 401c' to move axially towards the inner interactive member 401d' when hydraulic pressure is applied to the inner piston side plate 401c', and also retract the inner piston side plate 401c' axially from the inner interactive member 401d' when the inner piston side plate 401c' is inactive. The second V-groove clutch may also include a return spring s2 that is disposed between the inner side plate 401x and the inner piston side plate 401c' to urge the inner piston side plate 401c' away from the inner interactive member 401d' when the inner piston side plate 401c' is inactive.

The clutch assembly has a first coupling state and a second coupling state. In the first coupling state, the inner piston side plate 401c' is active, the outer piston side plate 401c is inactive, and the inner piston side plate 401c' urges the inner interactive member 401d' against the inner side plate 401x, thereby directly coupling the input gear 401 to the second bevel gear 401e. Therefore, in this first coupling state, the torque applied to the common torque transfer member 301a is based on the torque applied to the input gear 401 and the torque applied to the second torque input 002.

In the second coupling state, the outer piston side plate 401c is active, the inner piston side plate 401c' is inactive, and the outer piston side plate 401c urges the outer interactive member 401d against the outer side plate 401a, thereby directly coupling the input gear 401 to the first torque member 001. Therefore, in this second coupling state, the torque applied to the common torque transfer member 301a is based on the torque applied to the input gear 401 (i.e. independently of the torque applied to the second torque input 002).

As is apparent from the foregoing discussion, the difference between the velocity $\omega_3'$ of the third torque member 003/103/303 and the velocity $\omega_4'$ of the fourth torque member 004/104/304 is proportional to the absolute difference between the velocity $\omega_1$ of the first torque member 001/101/301 and the velocity $\omega_2$ of the second torque member 002/102/302, whether or not the ratios $k_M$, $k_R$ and $k_L$ are constrained by the requirements of Equation [3].

In other words:

$$\omega_3' - \omega_4' = (\omega_1 - \omega_2)\delta_L + (\omega_1 - \omega_2)\delta_R. \quad [10]$$

Since positive and negative differentials between the first torque member 001/101/301 and second torque member 002/102/302 may be created by engaging the first coupling state or the second coupling state of the reversing section, slow-speed turn manoeuvring can be achieved without requiring the biasing transmission to undergo a large positive to negative (or negative to positive) swing in output speed in order to effect a quick turn from left to right (or vice versa). However, if the output speed of the biasing transmission (first torque member) is less the output speed of the main transmission (second torque member), engaging the first or second coupling state will induce a turn in the opposite direction than if the output speed of the biasing transmission exceeds that of the main transmission. This logic can be built into a transmission controller module, if desired.

If the regenerative steering differential 100 is deployed in a tracked vehicle, an anomaly may occur when the biasing and main transmission input members are rotating in the same direction (either forward or reverse) and the transmission output speed ratio $$R_T = \frac{\omega_{Bias}}{\omega_{Main}}$$

is greater than $$\frac{1}{\delta} + 1.$$

In this case, a turn may still be produced in the tracked-vehicle as it is moving, for example, in the forward direction. However, the inner track may move in the reverse direction causing a spiralling turn.

To avoid this anomaly, the steering sensitivity factor $\delta$ may be chosen such that it does not exceed $$\frac{1}{R_{Tmax} - 1},$$

where $R_{Tmax}$ is the maximum possible transmission output speed ratio of the biasing to main transmissions. This choice of steering sensitivity factor $\delta$ will increase the usable transmission output speed ratio range of the two transmissions along with the track speed ratio range, producing finer increments between turning radii at lower to mid-range $R_T$ values (large turning radii) while still maintaining high track speed ratios at higher $R_T$ values (small turning radii).

FIG. 4a shows, for the regenerative steering differential depicted in FIGS. 1, 2, 3, turn radius as a function of steering-bias ($\omega_1 - \omega_2$), and the ratio of outer to inner track speed ("track speed ratio"), when both the main and biasing transmissions are incrementally variable, as described for example in U.S. Pat. No. 6,126,566 entitled "Coplanar Reverted Gear Train Loop", with a range of 20/1 and thirty-one equal incremental ratio changes equal to $(20/1)^{1/31}$. These performance characteristics were generated assuming that the biasing transmission drives the input gear 701, and the biasing and main transmissions have identical drivelines and ratio-states.

As shown, as manoeuvring takes place, all drag-torque from an inside track of a tracked-vehicle can translate directly to the outside track through the third and fourth torque members 003 and 004, without propagating back into the biasing and main transmissions via the first and second torque members 001 and 002. As the rate of turn increases, the power from the prime-mover decreases through the main transmission and increases through the biasing transmission at a ratio that is less than approximately 25% of that through the main transmission.

Figure 4B:
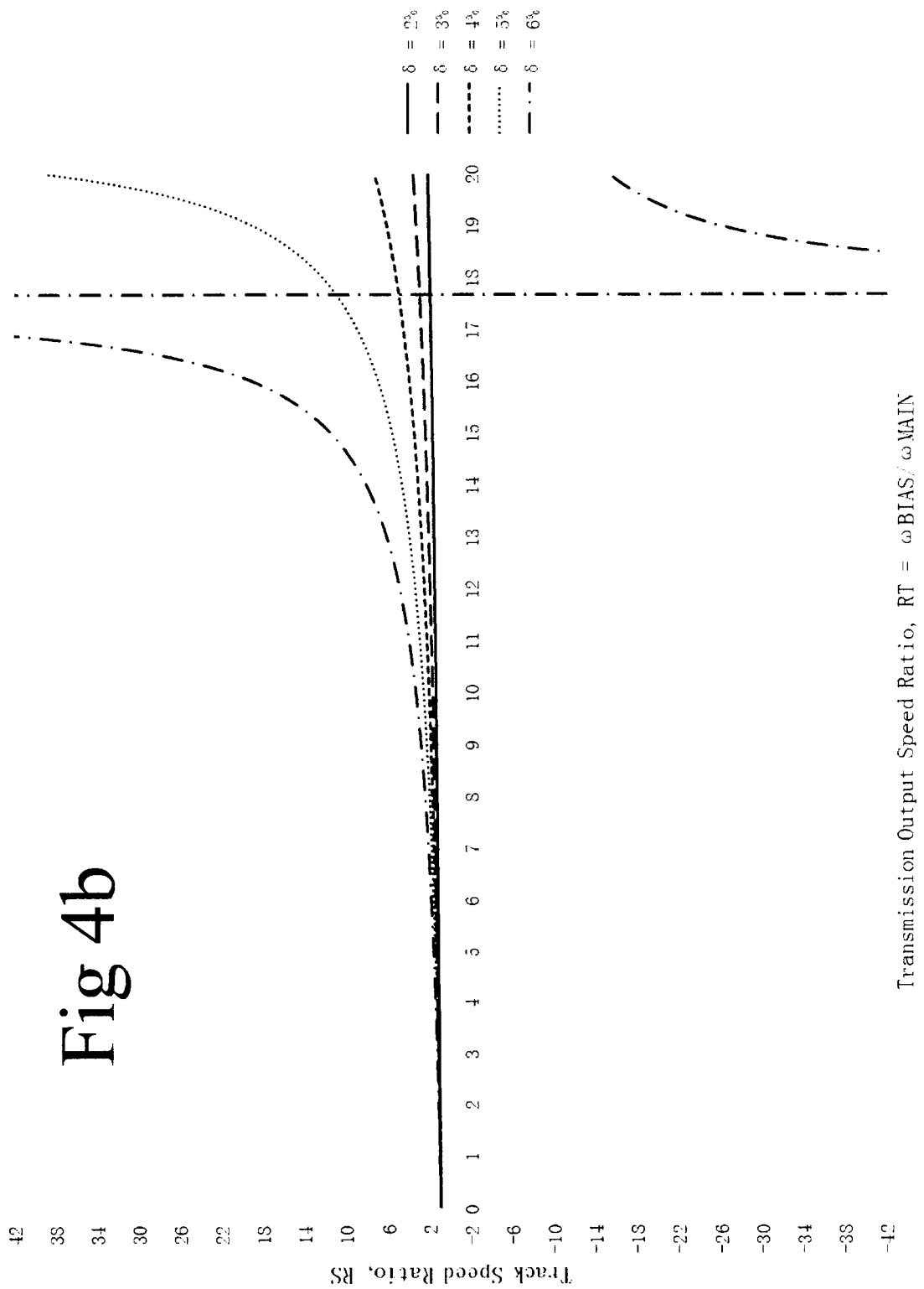
FIG. 4*b* is graph depicting track speed ratio versus transmission output speed ratio for the steering differential.

FIG. 4b shows the effects of track speed ratio and biasing/main transmission speed ratio as effected by the percentage difference in the plus and minus relative rotation between a left and a right track.

In the foregoing embodiments, the ratio $k_M$ of the primary gear set $= a_M/p_M$. Since the primary pinion 302c of the primary gear set of the foregoing embodiments is disposed radially inwards of the primary annular gear 302b, the ratio $k_M$ of the foregoing embodiments is greater than unity. FIG. 5 depicts one variation of the gear assembly, in which the ratio $k_M$ of the primary gear set is unity.

In this variation, the primary gear set may be provided as a one-to-one torque coupling, as described for example in International Patent Application WO 2016/019462 entitled "One-to-One Torque Coupling". Therefore, as shown, the primary gear set may include left and right side disc members 102b, a centre disc member 102a that is disposed between the side members 102b, and a plurality of bearing elements 102e that extend between the side members 102b and the centre member 102a.

The centre member 102a is secured to the second torque member 102 (corresponding to the second torque member 002), and rotates about an axis $c_1$ that is coincident with the axis of rotation $c_1$ of the torque member 102. The centre member 102a includes a plurality of thru-holes that are disposed at a fixed radius about the axis $c_1$.

Each side member 102b rotate about an axis of rotation $c_2$ that is parallel to and offset from the axis $c_1$. Each side member 102b includes a plurality of thru-holes that are disposed at a fixed radius about the axis $c_2$, and are congruent with the thru-holes in the centre member 102a. The bearing elements 102e may comprise cylindrical rollers that extend through the thru-holes of the side members 102b and the thru-holes of the centre member 102a. Therefore, torque is transferred between the centre member 102a and the side members 102b, through rolling contact between the cylindrical rollers 102e and the inner surfaces of the thru-holes of the centre member 102a and the side members 102b.

The first secondary gear set includes a first annular gear 103a, and a first pinion 103b that is disposed radially inwards of the first annular gear 103a. The first annular gear 103a is coupled to the third torque member 103 (corresponding to the third torque member 003) by a first disc member that extends radially outwards from the third torque member 303. The first pinion 103b is coplanar with, and in pitch circle congruency with, the first annular gear 103a.

The second secondary gear set includes a second annular gear 104b, and a second pinion 104a that is disposed radially inwards of the second annular gear 104b. The second pinion 104a is integral with the fourth torque member 104 (corresponding to the fourth torque member 004), and is coplanar with, and in pitch circle congruency with, the second annular gear 104b.

The side member 102b (of the primary gear set) and the first pinion 103b are secured to, and rotate with, a torque transfer member 102c that is disposed around the first torque member 101 (corresponding to the first torque member 001). The torque transfer member 102c may be configured as a spool that includes a cylindrical section that is disposed radially inwards of the primary gear set and the first secondary gear set, and a radially outward-extending end that carries the second annular gear 104b.

Since the side members 102b, the first pinion 103c and the second annular gear 104b are all secured to, or integral with, the torque transfer member 102c, the torque transfer member is common to the primary gear set, the first secondary gear set, and the second secondary gear set. However, the torque transfer member 102c and, therefore, the first pinion 103b and the second annular gear 104b all rotate about the axis $c_2$, which is parallel to and offset from, the axis $c_1$ about which the torque members 101, 102, 103, 104 rotate.

FIG. 5a depicts one variation of the gear assembly depicted in FIG. 5, but with the orientation of the primary gear set axially reversed to that of FIG. 5. Further, in this variation, the torque transfer member 102c may be configured as a spool that includes a cylindrical section that is disposed radially outwards of the primary gear set and the first secondary gear set, and a radially inward-extending end 102d that carries the second annular gear 104b.

Consistent with the foregoing embodiments, the gear assembly of FIG. 5/5a is configured to maintain a fixed kinematic relationship between the torque members 101, 102, 103, 104, such that the rotational velocity $\omega_3$ of the third torque member 103 is a linear weighted function of (i) the rotational velocity $\omega_1$ of the first torque member 101, (ii) the rotational velocity $\omega_2$ of the second torque member 102, and (iii) the ratio $k_L$ of the first secondary gear set. Similarly, the rotational velocity $\omega_4$ of the fourth torque member 104 is a linear weighted function of (i) the rotational velocity $\omega_1$ of the first torque member 101, (ii) the rotational velocity $\omega_2$ of the second torque member 102, and (iii) the ratio $k_R$ of the second secondary gear set.

However, in contrast to the foregoing embodiments, the ratio $k_M$ of the primary gear set=1. Therefore, the gear assembly depicted in FIG. 5/5a is configured such that:

$$\omega_3 = M_L\omega_2 + \Delta_L\omega_1, \text{ and}$$

$$\omega_4 = M_R\omega_2 + \Delta_R\omega_1,$$

where:

$$M_L = k_L,$$

$$\Delta_L = 1 - k_L,$$

$$M_R = k_R,$$

$$\Delta_R = 1 - k_R,$$

the ratio $k_L$ of the first secondary gear set=$p_L/a_L$, and the ratio $k_R$ of the second secondary gear set=$a_R/p_R$, and where:
$a_L$=the number of teeth on the first annular gear 103a,
$p_L$=the number of teeth on the first pinion 103b,
$a_R$=the number of teeth on the second annular gear 104b, and
$p_R$=the number of teeth on the second pinion 104a.

FIGS. 5b/5c depict one variation of the gear assembly depicted in FIG. 5/5a, with the one-to-one torque coupling replaced with a coplanar annulus/pinion $$\left(\frac{a}{p}\right)$$

gear set that includes a primary annular gear 102a (102a') that is secured to the second torque member 102, and a primary pinion 102b (102b') that is disposed radially inwards of the primary annular gear 102a (102a') and is secured to the torque transfer member 102c. FIG. 5d depicts another variation of the gear assembly depicted in FIGS. 5/5a, with the one-to-one torque coupling replaced with a coplanar pinion/annulus $$\left(\frac{p}{a}\right)$$

gear set that includes a primary annular gear 102a" that is secured to torque transfer member 102c, and a primary pinion 102b" that is disposed radially inwards of the primary annular gear 102a" and is secured to the second torque member 102.

These latter variations are kinematically similar to the gear assembly depicted in FIGS. 5/5a, except that the ratio $k_M$ of the primary gear set is not unity. In other words, the gear assembly is configured such that:

$$\omega_3 = M_L\omega_2 + \Delta_L\omega_1, \text{ and}$$

$$\omega_4 = M_R\omega_2 + \Delta_R\omega_1,$$

where:

$M_L = k_M k_L,$ $\Delta_L = 1 - M_L,$ $M_R = k_M k_R,$ $\Delta_R = 1 - M_R,$ the ratio $k_M$ of the primary gear set of FIGS. 5b/5c=$a_M/p_M$, and the ratio $k_M$ of the primary gear set of FIG. 5d=$p_M/a_M$, and where:

$a_M$=the number of teeth on the primary annular gear 102a/102a'/102a", and $p_M$=the number of teeth on the primary pinion 102b/102b'/102b".

Figure 6:
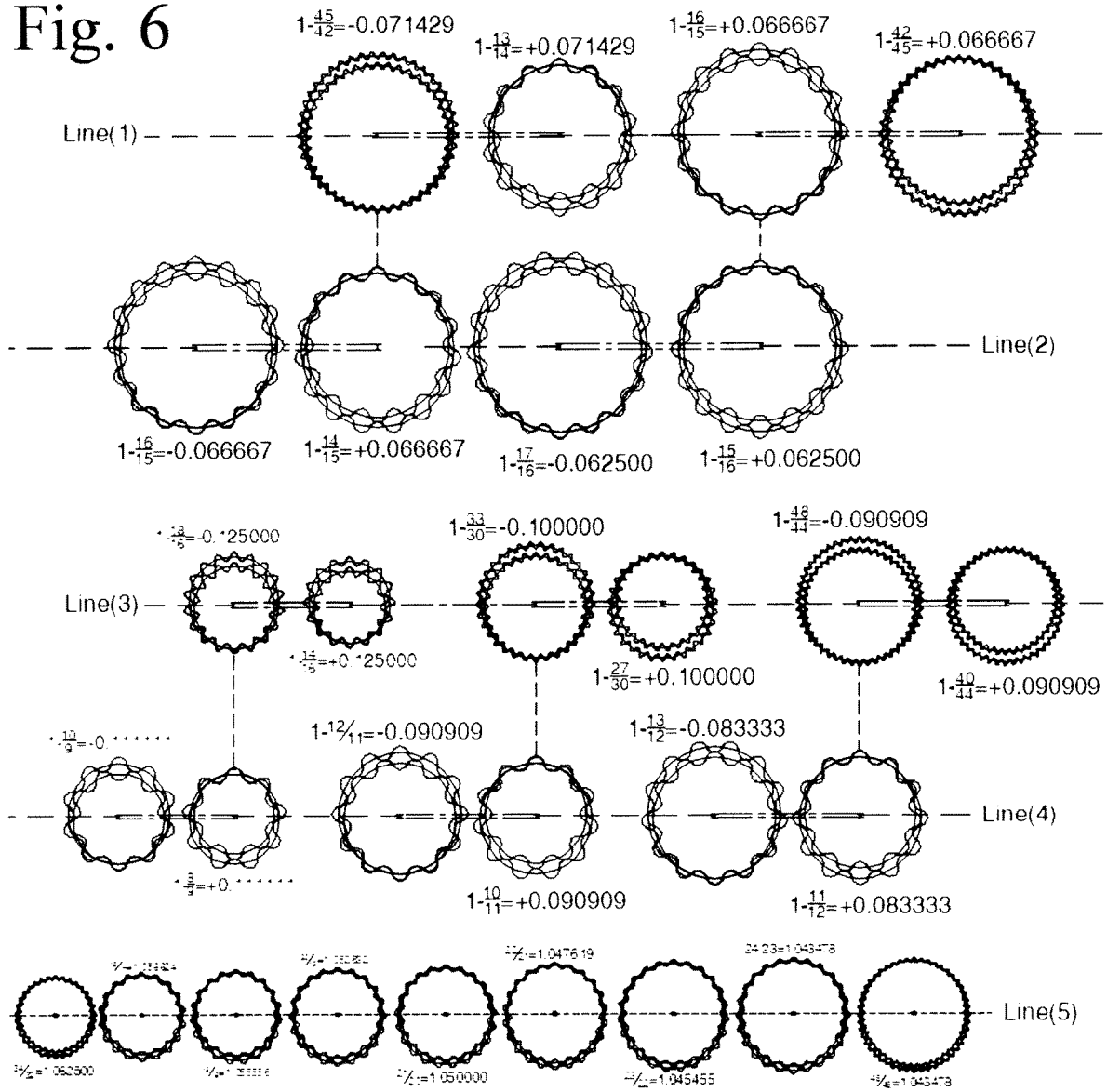
FIG. 6 depicts various pinion/annulus pairs that may be used in the steering differential of FIGS. 5, 5a, 5b, 5c, and 5d.

FIG. 6 depicts, in lines 1-4 thereof, by way of example, several pinion/annulus $$\left(\frac{p}{a}\right)$$

and annulus/pinion $$\left(\frac{a}{p}\right)$$

gear sets that can be used for the secondary gear sets of FIGS. 5/5a, with the factors $\Delta_L = 1-k_L$ and $\Delta_R = 1-k_R$ identified below each gear set. As shown therein, gear sets can be selected so as to provide the same sensitivity factors for left and right turns.

FIG. 6 depicts, in line 5 thereof, by way of example, several gear sets that can be used for the primary gear set of FIGS. 5b/5c/5d, with the ratio $k_M$ identified below each gear set.

In the foregoing embodiments, the reversing section was implemented using a pair of V-groove clutches. FIGS. 7a, 7b depict one variation of the reversing section, in which the V-groove clutches are replaced with cone clutches.

In this variation, the reversing section again includes the input gear 401, the symmetrical three-element bevel gear set, and a clutch assembly that is coupled to the input gear 401 and the bevel gear set. The bevel gear set includes the first bevel gear 401h, the second bevel gear 401e, and the third bevel gear 401f. However, in contrast to the foregoing embodiments, in this variation the clutch assembly includes an axially-moveable cylindrical interactive member 401z that is ball-splined to the underside of input gear member 401, a sleeve 401y that is splined to the first torque member 001, a right cone clutch 401m and a left cone clutch 401n that are coupled to the interactive member 401z, and a hydraulically-controlled actuator 401m-n.

As shown, the right and left cone clutches 401m, 401n may each include an outer clutch body member, an inner clutch body member, a tubular slipper y that is disposed between the inner and outer clutch body members. The inner clutch body member has a inner conical friction surface, and an outer cylindrical friction surface zt. The outer clutch body member has an inner bearing surface x, and an outer surface. The slipper y has an inner friction surface that frictionally engages the outer cylindrical friction surface zt of the inner clutch body member, and an outer bearing surface. The inner bearing surface x and the outer bearing together define a plurality of channels that retain roller bearings therein. The channels and the roller bearings are configured to couple the inner and outer clutch body members together as the slipper y and outer coupling member rotate relative to each other.

The outer surface of the outer clutch body member of the right and left cone clutches 401m, 401n are each fixed to the underside of the interactive member 401z. The inner conical friction surface of the inner clutch body member of the right cone clutch 401m frictionally engages the sleeve 401y. The inner conical friction surface of the inner clutch body member of the left cone clutch 401n frictionally engages the second bevel gear 401e.

As shown in FIG. 7b, the actuator 401m-n includes left and right half T-shaped pistons b, e, and diametrically opposite cylinders that incorporate springs c, d that hold the pistons b, e in a central position. The interactive member 401z that is ball-splined to the actuator 401m-n via bearing elements a and, therefore, axially moves towards the inner clutch body members of the right and left cone clutches 401m, 401n as the pistons b, e are actuated.

The clutch assembly has a first coupling state and a second coupling state. In the first coupling state, the piston e is active, the piston b is inactive, and the interactive member 401z urges the outer clutch body member and the tubular slipper y of the left cone clutch n axially leftwards, thereby directly coupling the input gear 401 to the second bevel gear 401e. Therefore, the torque applied to the common torque transfer member is based on the torque applied to the input gear 401 and the torque applied to the second torque input 002.

In the second coupling state, the piston b is active, the piston e is inactive, and the interactive member 401z urges the outer clutch body member and the tubular slipper y of the right cone clutch m axially rightwards, thereby directly coupling the input gear 401 to the first torque member 001. Therefore, in this second coupling state, the torque applied to the common torque transfer member is based on the torque applied to the input gear 401 (i.e. independently of the torque applied to the second torque input 002).

Figure 7C:
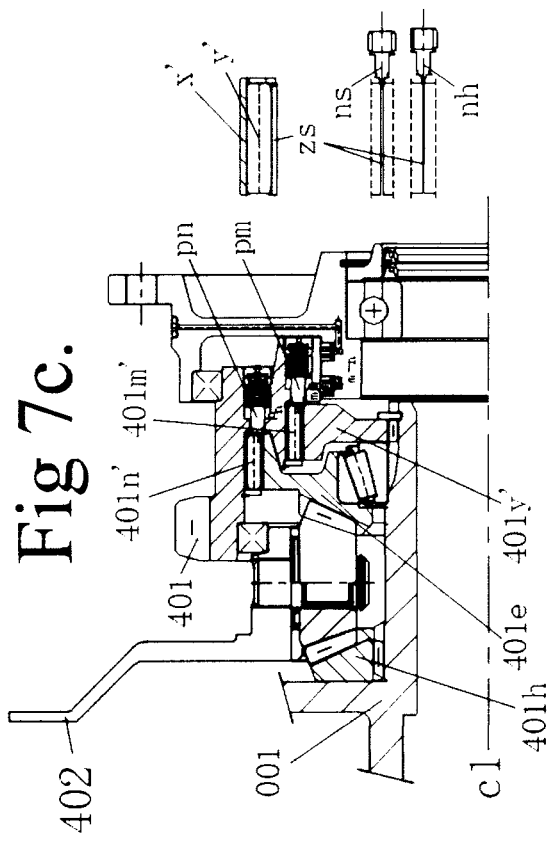
FIG. 7c is a longitudinal cross-section of one variation of the steering differential, in which the reversing section includes full compliment multi-directional couplings.
Figure 7A:
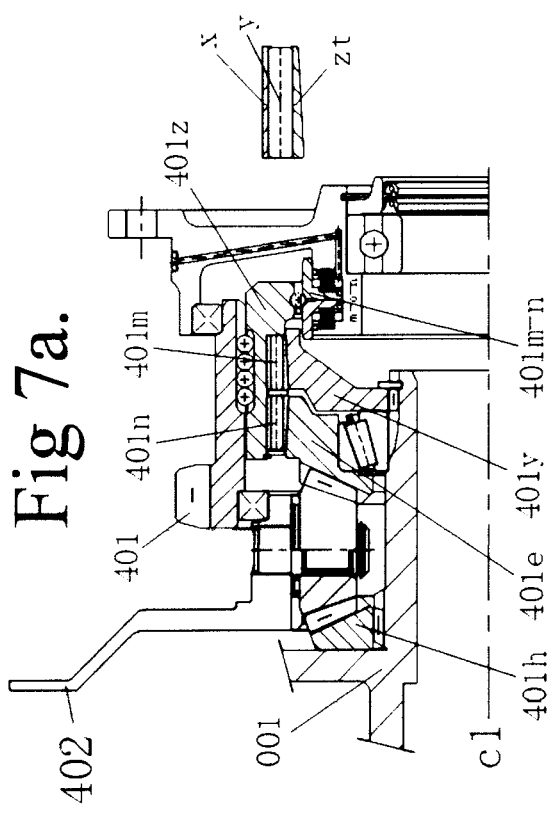
FIG. 7a is a longitudinal cross-section of one variation of the steering differential, in which the reversing section includes cone clutches.
Figure 7B:
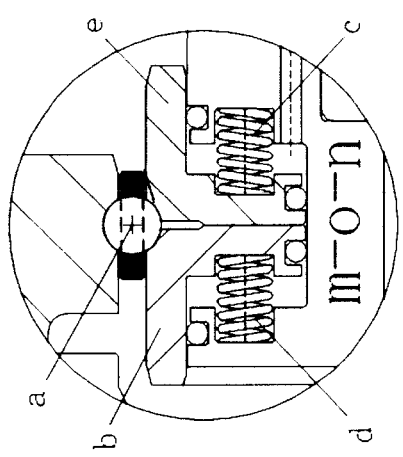
FIG. 7b is a break-out of FIG. 7a showing the shuttling components thereof.

FIG. 7c depicts another variation of the reversing section, in which the V-groove clutches are replaced with full complement couplings, as described for example in U.S. Pat. No. 6,409,001 entitled "Full-Complement Multi-Directional Coupling". Therefore, in this variation, the clutch assembly includes an inner full compliment multi-directional coupling 401m' with associated actuator pm, and an outer full compliment multi-directional coupling 401n' with associated actuator pn.

In the first coupling state, the actuator pn is active, the actuator pm is inactive, and the coupling 401n' directly couples the input gear 401 to the second bevel gear 401e, and the torque applied to the common torque transfer member is based on the torque applied to the input gear 401 and the torque applied to the second torque input 002.

In the second coupling state, the actuator pm is active, the actuator pn is inactive, and the coupling 401m' directly couples the input gear 401 to the first torque member 001, and the torque applied to the common torque transfer member is based on the torque applied to the input gear 401 (i.e. independently of the torque applied to the second torque input 002).

Figure 8:
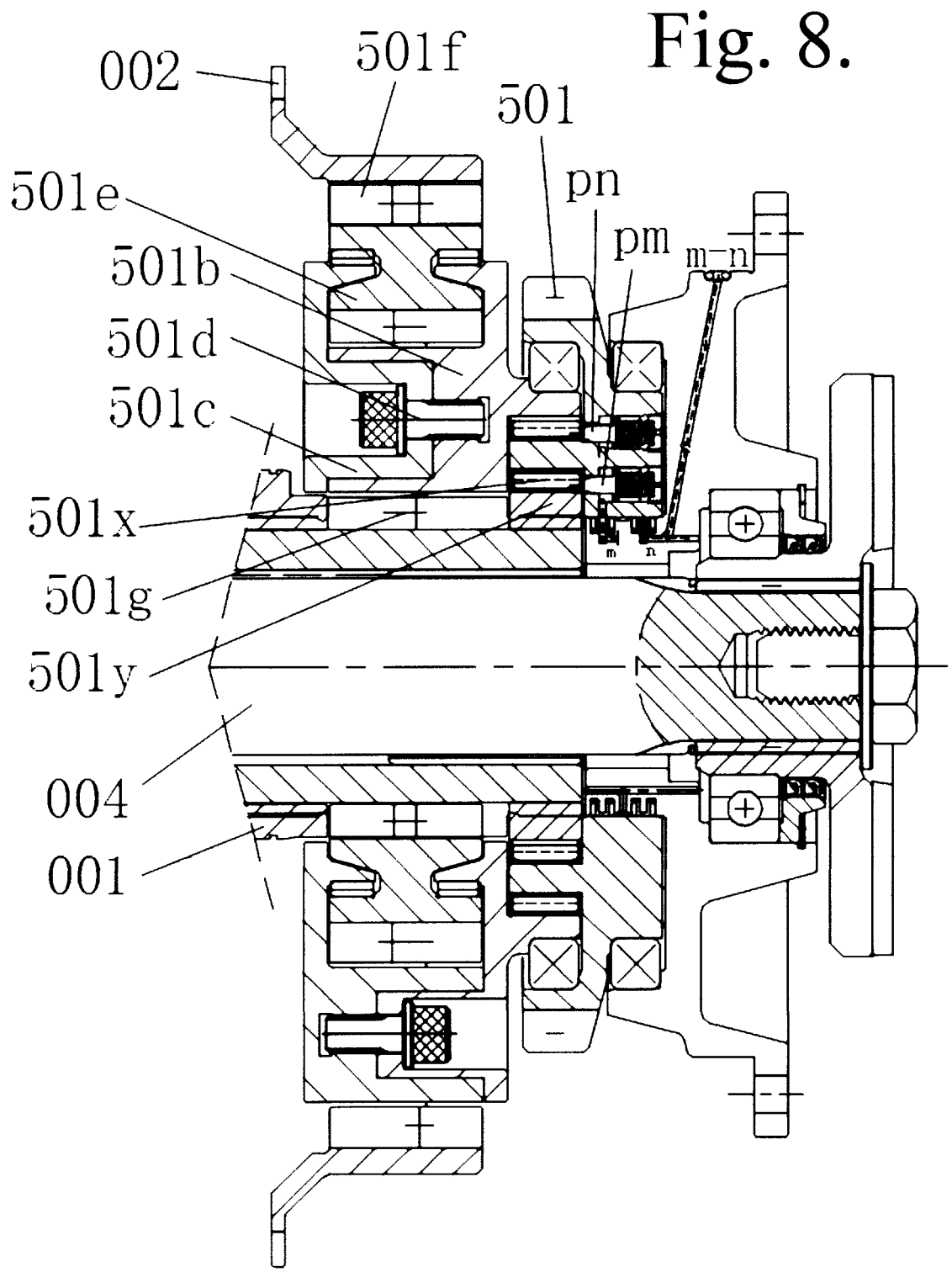
FIG. 8 is a longitudinal cross-section of one variation of the steering differential, in which the reversing section includes a coplanar reverted gear-train loop.

FIG. 8 depicts another variation of the reversing section, in which the V-groove clutches are replaced with the full compliment multi-directional couplings of FIG. 7c, and the three-element bevel gear set is replaced with a coplanar reverted gear-train loop, as described for example in U.S. Pat. No. 6,126,566 entitled "Coplanar Reverted Gear Train Loop".

Therefore, the reversing section includes an annular gear 501*f* that is coupled to the second torque member 002, a cluster gear 501*e* that is disposed radially inwards of the annular gear 501*f*, and a pinion 501*g* that is secured to the first torque member 001 and is disposed radially inwards of the cluster gear 501*e*. The reversing section also includes a cage member 501*b* that is configured to maintain cluster gear 501*e* coplanar with the annular gear 501*f* and the pinion 501*g*.

The cage member 501*b* is also configured to maintain the axis of rotation of the cluster gear 501*e* parallel to and offset from the axis of rotation of the annular gear 501*f* and the pinion 501*g*, and to maintain the cluster gear 501*e* in pitch circle congruency with the annular gear 501*f* and the pinion 501*g* (i.e. the cluster gear 501*e* has radially outward-extending gear teeth that mesh with radially inward-extending gear teeth of the annular gear 501*f*, and radially inward-extending gear teeth that mesh with radially outward-extending gear teeth of the pinion 501*g*).

The clutch is coupled to the input gear 501 (corresponds to input gear 401), and is configured to couple the input gear 501 to the cage member 501*b* in the first coupling state, and to couple the input gear 501 to the first torque member 001 in the second coupling state.

FIGS. 9/9*a*, are breakouts from FIG. 8, and show how the actuator pm and the inside split-slipper s of the multi-directional full compliment coupling provide the clutching and free-wheeling modes of the coupling. As shown, when the actuator pm engages the slipper s, the split-side faces of the slipper s become separated by a wedging action that prevents congruency between the slipper s and the race surface 501*y* (as indicated by clearance cL), so that rotation of race surface 501*y* is independent to that of the input gear 501. This action assumes that front plate element b with plunger axial ports and alignment lugs u to the coupling body element a remain aligned with the plunger pm of the input gear 501.

Conversely, when the actuator pm is withdrawn from the slipper s by hydraulic action, the race surface 501*y* and the input gear 501 rotate in unison, in either direction, coupled together.

Therefore, in the first coupling state of the clutch, the actuator pn is active and the actuator pm is inactive, and the coupling 401*n*' directly couples the input gear 501 to the cage 501*b*, which produces a kinematic relationship through the coplanar gear train loop such that one revolution of the input gear 501 (with the annulus 501*f* held fixed) causes the output element 501*g* to rotate one revolution in the opposite direction to that of the input gear 501. Conversely, in the second coupling state of the clutch, the actuator pm is active and the actuator pn is inactive, and the coupling 401*m*' couples the input gear 501 to the first torque member 001 via pinion 501*g* and allows the cage member 501*b* and the ring gear 501*e* to freewheel. Therefore, in this second coupling state, the direction of rotation of the first torque member 001 is the same as that of the input gear 501.

Therefore, in the first coupling state, the torque applied to the common torque transfer member is again based on the torque applied to the input gear 501 and the torque applied to the second torque input 002. In contrast, in the second coupling state, the torque applied to the common torque transfer member is based on the torque applied to the input gear 501 (i.e. independently of the torque applied to the second torque input 002).

The invention claimed is:

1. A regenerative differential comprising:
   a plurality of torque members; and
   a gear assembly comprising a primary gear set and a plurality of secondary gear sets coupled to the primary gear set, the primary gear set being coupled to a first of the torque members and to a second of the torque members and configured to transfer torque between the secondary gear sets and the first and second torque members via a common torque transfer member common to the secondary gear sets, wherein a first of the secondary gear sets is coupled to a third of the torque members and is configured to transfer torque between the common torque transfer member and the third torque member, and a second of the secondary gear sets is coupled to a fourth of the torque members and is configured to transfer torque between the common torque transfer member and the fourth torque member,
   wherein the gear assembly is configured to maintain a fixed kinematic relationship between $\omega_1$, $\omega_2$, $\omega_3$ and $\omega_4$, as follows:

$$\omega_3 = M_L \omega_2 + \Delta_L \omega_1, \text{ and}$$

$$\omega_4 = M_R \omega_2 + \Delta_R \omega_1,$$

where:
   $M_L$ and $\Delta_L$ are functions of $k_L$, and
   $M_R$ and $\Delta_R$ are functions of $k_R$,
and where:
   $k_L$ is a ratio of the first secondary gear set,
   $k_R$ is a ratio of the second secondary gear set,
   $\omega_1$ is a rotational velocity of the first torque member,
   $\omega_2$ is a rotational velocity of the second torque member,
   $\omega_3$ is a rotational velocity of the third torque member, and
   $\omega_4$ is a rotational velocity of the fourth torque member.

2. The regenerative differential according to claim 1, wherein:

$$M_L = k_M k_L,$$

$$\Delta_L = 1 - k_M k_L,$$

$$M_R = k_M k_R, \text{ and}$$

$$\Delta_R = 1 - k_M k_R,$$

where:
   $k_M$ is a ratio of the primary gear set measured relative to the common torque transfer member,
   $k_L$ is measured relative to the third torque member, and
   $k_R$ is measured relative to the fourth torque member.

3. The regenerative differential according to claim 1, wherein the gear assembly is configured to simultaneously rotate the third torque member at a velocity $\omega_3'$ and the fourth torque member at a velocity $\omega_4'$, and wherein a difference between the velocity $\omega_3'$ and the velocity $\omega_4'$ is proportional to an absolute difference between the velocity $\omega_1$ and the velocity $\omega_2$.

4. The regenerative differential according to claim 3, wherein:

$$\omega_3' = \omega_2 + (\omega_1 - \omega_2)\delta, \text{ and}$$

$$\omega_4' = \omega_2 - (\omega_1 - \omega_2)\delta,$$

and wherein:

$$\delta = 1 - k_M k_L = k_M k_R - 1,$$

$k_M$ is a ratio of the primary gear set measured relative to the common torque transfer member, $k_L$ is measured relative to the third torque member, and $k_R$ is measured relative to the fourth torque member.

5. The regenerative differential according to claim 1, wherein the gear assembly is configured to simultaneously rotate the third torque member at velocity $\omega_3'$ proportional to the velocity $\omega_1$, and to rotate the fourth torque member at velocity $-\omega_3'$, wherein $\omega_2=0$.

6. The regenerative differential according to claim 5, wherein:

$$\omega_3'=\omega_1\delta,$$

$$\delta=1-k_M k_L=k_M k_R-1,$$

$k_M$ is a ratio of the primary gear set measured relative to the common torque transfer member, $k_L$ is measured relative to the third torque member, and $k_R$ is measured relative to the fourth torque member.

7. The regenerative differential according to claim 1, wherein the gear assembly is configured to simultaneously rotate the third torque member and the fourth torque member at velocity $\omega_3'$ equal to the velocity $\omega_2$, when $\omega_1=\omega_2$.

8. The regenerative differential according to claim 7, wherein:

$$\delta=1-k_M k_L=k_M k_R-1,$$

$k_M$ is a ratio of the primary gear set measured relative to the common torque transfer member, $k_L$ is measured relative to the third torque member, and $k_R$ is measured relative to the fourth torque member.

9. The regenerative differential according to claim 1, wherein the primary gear set includes a primary annular gear and a primary pinion in pitch circle engagement with the primary annular gear, the first secondary gear set includes a first annular gear and a first pinion in pitch circle engagement with the first annular gear, and the second gear set includes a second annular gear and a second pinion in pitch circle engagement with the second annular gear, and wherein the primary pinion, the first pinion and the second pinion comprise a monolithic pinion gear rotatably mounted to the first torque member.

10. The regenerative differential according to claim 1, wherein the first secondary gear set includes a first annular gear and a first pinion in pitch circle engagement with the first annular gear, and the second gear set includes a second annular gear and a second pinion in pitch circle engagement with the second annular gear, and wherein the common torque transfer member is configured as a spool that includes a cylindrical section and a radially outward-extending end, and wherein the cylindrical section is disposed radially inwards of the first secondary gear set, and the radially outward-extending end carries the second annular gear.

11. The regenerative differential according to claim 1, wherein the first secondary gear set includes a first annular gear and a first pinion in pitch circle engagement with the first annular gear, and the second gear set includes a second annular gear and a second pinion in pitch circle engagement with the second annular gear, and wherein the common torque transfer member is configured as a spool that includes a cylindrical section and a radially inward-extending end, and wherein the cylindrical section is disposed radially outwards of the first secondary gear set, and the radially inward-extending end carries the second annular gear.

12. The regenerative differential according to claim 1, further including a reversing section configured to selectively apply to the common torque transfer member a torque that is based on a torque applied to a torque input of the reversing section and a torque applied to a torque input of the gear assembly.

13. The regenerative differential according to claim 12, wherein the reversing section comprises a first bevel gear fixed to the first torque member, a second bevel gear rotatably coupled to the first torque member, a third bevel gear configured to transfer torque between the first bevel gear and the second bevel gear, and a clutch coupled to the torque input, wherein the clutch has a first coupling state and a second coupling state, and wherein the clutch is configured to couple the torque input of the reversing section and the torque input of the gear assembly to the first bevel gear in the first coupling state, and to couple the torque input of the reversing section to the first torque member in the second coupling state.

14. The regenerative differential according to claim 12, wherein the reversing section comprises an annular gear coupled to the second torque member, a ring gear disposed radially inwards of the annular gear, a pinion disposed radially inwards of the ring gear and secured to the first torque member, a cage member configured to maintain an axis of rotation of the ring gear parallel to and offset from an axis of rotation of the annular gear and the pinion and to maintain the ring gear in pitch circle engagement with the annular gear and the pinion, and a clutch coupled to the torque input, and wherein the clutch is configured to couple the torque input of the reversing section and the torque input of the gear assembly to the cage member in the first coupling state, and to couple the torque input of the reversing section to the first torque member in the second coupling state.

* * * * *